(12) United States Patent
Usui et al.

(10) Patent No.: US 7,563,420 B2
(45) Date of Patent: Jul. 21, 2009

(54) METHOD FOR RECOVERING RHODIUM AND SILVER FROM HYDROCHLORIC ACID

(75) Inventors: Shoujirou Usui, Oita (JP); Yoshio Ito, Oita (JP); Nobuaki Okajima, Oita (JP); Kazuhiro Sekine, Hitachi (JP)

(73) Assignee: Nippon Mining & Metals Co., Ltd., Tokyo (JP)

( * ) Notice: Subject to any disclaimer, the term of this patent is extended or adjusted under 35 U.S.C. 154(b) by 69 days.

(21) Appl. No.: 11/730,125

(22) Filed: Mar. 29, 2007

(65) Prior Publication Data

US 2007/0248513 A1 Oct. 25, 2007

(30) Foreign Application Priority Data

Mar. 31, 2006 (JP) .............................. 2006-097467
Dec. 26, 2006 (JP) .............................. 2006-348788

(51) Int. Cl.
*C22B 11/00* (2006.01)
(52) U.S. Cl. .......................................... 423/22; 423/34
(58) Field of Classification Search ................... 423/22, 423/34
See application file for complete search history.

(56) References Cited

U.S. PATENT DOCUMENTS

2005/0066774 A1    3/2005  Asano et al.

FOREIGN PATENT DOCUMENTS

| | | |
|---|---|---|
| JP | 61-183420 A | 8/1986 |
| JP | 10-226828 A | 8/1998 |
| JP | 2005-097695 A | 4/2005 |
| JP | 2007-9306 A | 1/2007 |

OTHER PUBLICATIONS

Database WPI Week 200715 Derwent Publications Ltd., London, GB; AN 2007-145972 XP-002440095 & JP2007009306 A (Nikko Gold Foil Co Ltd) Jan. 18, 2007.

*Primary Examiner*—Steven Bos
(74) *Attorney, Agent, or Firm*—Birch, Stewart, Kolasch & Birch, LLP

(57) ABSTRACT

Object: This invention provides a method of refining an Rh-containing solution also containing at least one type of impurities of heavy metals, alkaline earth metals, and Ag.

Means for solving the problems: The invention provides a method of refining an Rh-containing hydrochloric acid solution also containing Ag and at least one other impurity of heavy metals and alkaline earth metals, the method comprising the steps of: (a) adding an alkali to the solution to adjust pH of the solution to 7-12, whereby generating a neutralized precipitate containing Rh and other components; (b) filtrating and separating the neutralized precipitate; (c) adding a first hydrochloric acid for redissolving the neutralized precipitate in an amount such that the mole ratio of Cl to Rh (mole ratio Cl/Rh) of a resulting solution becomes 3-4; (d) filtering the resulting solution to remove Ag as precipitate, and (e) extracting the solution obtained by the previous step as an aqueous phase with DEHPA.

6 Claims, 6 Drawing Sheets

METHOD FOR RECOVERING RHODIUM AND SILVER FROM HYDROCHLORIC ACID

TECHNICAL FIELD

This invention relates to a method of refining Rh-containing solutions such as an Rh-containing hydrochloric acid also containing heavy metals, alkaline earth metals, and Ag obtained by processing intermediate residues during processes for recovering noble metals from electrolytic copper slime.

BACKGROUND OF THE INVENTION

There have been few disclosures of the technique for effectively recovering Rh from such solution containing noble metals such as Rh.

However, Japanese Patent Application Laid-Open Publication No. 2005-97695 "Mutual separation method of platinum group element" discloses a mutual separation method of platinum group elements such as Pd, Pt, Ir and Rh.

This publication does not disclose any examples in which the solution contains Ag. Therefore, the publication does not disclose any troubles, which could occur during a recovery process of Rh using an extracting agent.

The inventors have found out that when Rh is to be recovered from a solution containing Ag, because of poor phase-separation property, Rh cannot be effectively recovered. Further, it has been found that impurities such as Fe and Pb remain in the post-extraction solution, thereby Rh recovery cannot be conducted effectively.

SUMMARY OF THE INVENTION

Problems to be Solved

The object of the invention is to provide a method of recovering high purity Rh, the method being capable of solving the above-mentioned problems of the poor phase-separation and the residue of impurities such as Fe and Pb and thus effectively refining an Rh-containing solution also containing heavy metals, alkaline earth metals, and Ag.

Means for Solving the Problem

The inventors have created the following invention to solve the above-mentioned problems. That is, (1) A method of refining an Rh-containing hydrochloric acid solution also containing Ag and at least one other impurity of heavy metals and alkaline earth metals, the method comprising the steps of:

(a) adding an alkali to the solution to adjust pH of the solution to 7-12, whereby generating a neutralized precipitate containing Rh and other components;

(b) filtrating and separating the neutralized precipitate;

(c) adding a first hydrochloric acid for redissolving the neutralized precipitate in an amount such that the mole ratio of Cl to Rh (mole ratio Cl/Rh) of a resulting solution becomes 3-4;

(d) filtering the resulting solution to remove Ag as a precipitate, and (e) extracting the solution obtained by the previous step as aqueous phase with DEHPA.

(2) The method according to (1), wherein step (c) comprises adding the first hydrochloric acid in an amount such that the mole ratio Cl/Rh of the resulting solution becomes 2.7-3.5, and further comprising step (d') that is performed between steps (d) and (e), step (d') comprising adding a second hydrochloric acid in an amount such that the mole ratio Cl/Rh of a resulting solution becomes 4-8.

(3) The method according to (1), wherein, in step (c), the resulting solution is heated at or above 90° C. and then cooled.

(4) The method according to (2), wherein, in step (d'), the resulting solution is heated at or above 90° C. and then cooled to room temperature.

(5) The method according to any one of (1) to (4), wherein, in step (c) or (d'), Ru in the resulting solution is reduced to or less than 20 mg/L to keep the recovery rate of Rh into the aqueous phase high.

Effect of the Invention

According to one aspect of the present invention, in which the mole ratio of Cl to Rh in the solution is adjusted to 3-4 before the extraction with di(2-ethylhexyl)phosphoric acid (hereinafter referred to as "DEHPA"), heavy metals and alkaline earth metals can be sufficiently removed while keeping Rh loss at a lower level.

According to another aspect of the present invention, in which hydrochloric acid is added twice to keep Ag from being dissolved as a chloro complex, Rh loss can be further reduced.

According to a further aspect of the present invention, in which Ru in the solution is reduced to or less than 20 mg/L before the extraction with DEHPA, heavy metals and alkaline earth metals can be sufficiently removed while keeping Rh loss at a lower level.

DESCRIPTION OF THE PREFERRED EMBODIMENTS

Figure 1:
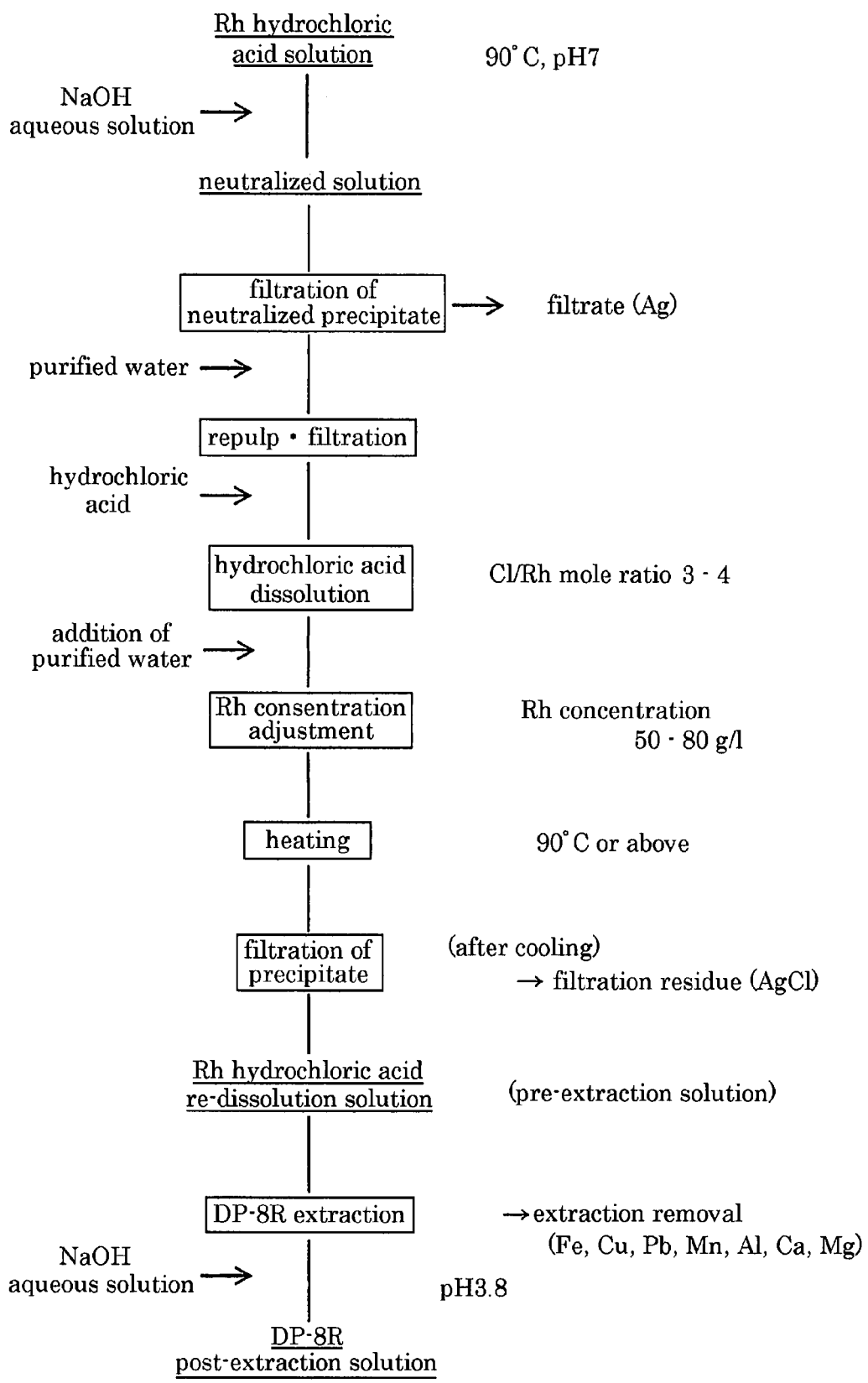
FIG. 1 shows a flow sheet of one aspect of the invention.

The invention will be explained in detail below. According to an embodiment of the present invention, the solution to be refined may result from the recovery process of noble metals from electrolytic copper slime or spent catalyst and contain Ag.

For example, the solution may contain 50 mg/L-1 g/L of Pt, 50-400 mg/L of Pd, 1-30 mg/L of Ru, 15 mg/L-3 g/L of Ir, 100 mg/L-40 g/L of Rh, 0.5-1.5 g/L of Ag, 0.5-2 g/L of Fe, and 50 mg/L-2 g/L of Pb.

The solution is hydrochloric acid. The concentration of hydrochloric acid may be, but not limited to, in the range of 0.1-8.0 mol/L.

Alkaline chemical is added to the solution, i.e., Rh-containing hydrochloric acid. The alkaline chemical may be caustic soda, for example.

The addition of alkaline chemical adjusts pH of the solution to 7-12 when Rh and other components are recovered as a neutralized precipitate. By doing this, Rh can be recovered as a neutralized precipitate by filtration and separation without being left in the solution after the neutralization. Incidentally, during the filtration and separation, part of Ag may be separated into the filtrate.

Single Addition of Hydrochloric Acid

The mole ratio Cl/Rh is adjusted to 3-4 when the neutralized precipitate containing Rh and other components is redissolved in hydrochloric acid. The inventors have found out that Rh loss is very small in this range of mole ratios. When the mole ratio Cl/Rh is less than 3, an intermediate phase may be generated during the extraction with DEHPA, resulting in an increase of Rh loss and higher concentration of heavy metals in the post-extraction solution. When the mole ratio Cl/Rh is higher than 4, the solubility of Ag, which is an impurity with respect to Rh, may increase, and Ag concentration may become higher in the post-extraction solution, although there is no adverse effect on Rh loss.

In one embodiment of the present invention, the heating temperature and time may be one hour or longer and 90° C. or above respectively when the neutralized precipitate containing Rh and other components is redissolved in hydrochloric acid. The heating temperature and time can be easily controlled by monitoring the color change of the Rh-containing solution. For example, when heated at or above 90° C, redness obviously increases and the solution becomes reddish brown. When the solution is to be heated to 100° C., the solution, which is originally blackish brown, starts taking on slight redness near 80° C. and the redness further increases at or above 90° C. as mentioned above. This color change is believed to be caused by the progress of Cl coordination to Rh. More particularly, Rh chloro complex, such as [$RhCl_3(H_2O)_3$] is supposed to be generated by adding hydrochloric acid to adjust the mole ratio Cl/Rh to or above 3, The coordination number of Cl to Rh is believed to change depending on Cl concentration in the solution, heating temperature and heating time. When the Cl concentration in the solution is appropriate, the higher heating temperature may lead to sufficient Cl coordination to Rh in a shorter heating time.

After the heated Rh solution is cooled to room temperature, precipitated AgCl can be filtered and separated, and Ag concentration in the filtrate can be reduced to 45-80 mg/L. Incidentally, since the grain size of AgCl is small, it is preferably filtered with a fine filter, and may be completely eliminated when filtered with 0.1 μm membrane filter.

Separate Addition of Hydrochloric Acid

By dividing the addition of hydrochloric acid into two additions when the Rh-containing neutralized precipitate is redissolved in hydrochloric acid, Rh loss can further be reduced in DEHPA extraction while preventing Ag from being dissolved as a chloro complex. Ag concentration in the filtrate can be reduced to or less than 80 mg/L without substantially any undissolved Rh by adjusting the amount of the first hydrochloric acid such that mole ratio Cl/Rh becomes 2.7-3.5 as the neutralized precipitate containing Rh and other components is redissolved in hydrochloric acid, and filtering the redissolved Rh-containing hydrochloric acid to eliminate Ag as a precipitate. If the amount of added hydrochloric acid is too large, Ag solubility increases, and Ag concentration in the filtrate becomes higher. If the amount of added hydrochloric acid is too small, part of Rh in the neutralized precipitate is not dissolved, thereby undissolved Rh is generated as a filtration residue during the filtration.

Further, heavy metals and alkaline earth metals can be removed to a level at which Rh in the order of 4N purity can be produced, without substantial Rh loss from the aqueous phase by adding the second hydrochloric acid to the filtrate such that mole ratio Cl/Rh becomes 4-8, heating the solution to or above 90° C., and extracting with DEHPA. If the extraction with DEHPA is conducted without the addition of the second hydrochloric acid and the heating of the solution, due to insufficient Cl coordination to Rh, an intermediate phase may be generated and Rh loss from the aqueous phase increases.

Incidentally, if NaCl is contained in the above-mentioned neutralized precipitate, Cl concentration should be reduced in order to facilitate precipitation and removal of Ag when the neutralized precipitate is redissolved in hydrochloric acid. Salting-out during the extracting operation should be also prevented. Hence, the neutralized precipitate should be filtered after it is repulp-washed with purified water in order to separate NaCl into the filtrate before it is redissolved in hydrochloric acid.

Preremoval of Ru

Further, if Ru is contained in Rh-containing hydrochloric acid when Rh is extracted with DEHPA, a waste-oil like sticky and viscous intermediate phase may be generated during the extraction, and Rh loss may increase. Although it is not certain, it is believed that since Ru cannot exist stably in the aqueous phase during the extracting operation, it forms sludge. Accordingly, Ru preferably needs to be reduced to or less than 20 mg/L in advance by such method as distillation before the extracting operation.

EXAMPLES

Single Addition of Hydrochloric Acid

The method according to the present invention with single addition of hydrochloric acid will be explained below along the flow sheet shown in FIG. 1. In the following Examples and Comparative Examples, the analysis was conducted by an ICP emission spectroscopic analyzer.

Example 1

As a starting material, the Rh-containing hydrochloric acid solution shown in Table 1 was used.

TABLE 1

|  | Concentration (mg/l) | | | | | | | | | | | | |
| --- | --- | --- | --- | --- | --- | --- | --- | --- | --- | --- | --- | --- | --- |
|  | Pt | Pd | Ru | Rh | Ir | Mg | Ca | Mn | Fe | Al | Cu | Pb | Ag |
| Rh-containing hydrochloric acid solution | 218 | 140 | 0 | 20709 | 965 | 5 | 30 | 10 | 486 | 31 | 184 | 67 | 819 |
| HCl re-dissolution (before filtration) | 180 | 84 | 23 | 38736 | 2685 | 11 | 73 | 37 | 1856 | 88 | 503 | 176 | 4346 |
| HCl re-dissolution (after filtration) | 234 | 0 | 0 | 35830 | 1229 | 11 | 66 | 36 | 1718 | 88 | 521 | 168 | 37 |
| DP-8R post-extraction solution | 403 | 45 | 0 | 36418 | 2209 | 0 | 0 | 0 | 9 | 0 | 0 | 4 | 32 |

After adding NaOH aqueous solution to 250 mL of this solution to adjust pH of the solution to 7 at 90° C., it was left overnight to be cooled. The neutralized precipitate was vacuum-filtered with 5 C. filter to remove part of Ag into the filtrate. After the neutralized precipitate was repulp-washed with purified water, the vacuum-filtration was repeated twice to sufficiently remove NaCl.

Hydrochloric acid was added such that the mole ratio Cl/Rh of the neutralized precipitate became 3.1, and it was heated to 60° C. for redissolution. After purified water was added to adjust Rh concentration in the solution to about 40 g/L, the solution was heated for one hour at 90° C. in order to accelerate Cl coordination to Rh. The color of the solution changed from blackish brown to reddish brown. After being left overnight to be cooled, the precipitate, which was predominantly composed of AgCl, was filtered and separated with 0.1 μm membrane filter. As shown in Table 1, Ag was considerably reduced to 37 mg/L after the filtration from 4346 mg/L before the filtration.

Solvent extraction was conducted by using DP-8R (Daihachi Chemical Industry Co., Ltd.) as an extracting agent DEHPA, which was diluted to 20% with kerosene. 20% DP-8R was added to the redissolved hydrochloric acid at the rate of O/A=2:1, and NaOH aqueous solution was added to adjust pH to 3.8 with stirring. After being stirred for 30 minutes, the solution was transferred to a separating funnel to leave it at rest, and an organic phase and an aqueous phase were separated. After repeating this operation twice, the aqueous phase was defined as DP-8R post-extraction solution. Phase-separation was well observed in both extracting operations. Table 1 shows analytical values. All heavy metals except Ag, and alkaline earth metals were reduced to or less than 10 mg/L, and Fe and Pb were reduced to 9 mg/L and 4 mg/L respectively. Rh loss in the extracting operation was 0.1%. Rh loss in the extracting operation is calculated with the following equations.

Rh loss in extraction (%)=$(C-D)/C*100$ $C$: an amount of Rh before extraction (g)=an amount of pre-extract solution (L)* Rh concentration analytical value in pre-extraction solution (mg/L)/1000

$D$: an amount of Rh after extraction (g)=an amount of post-extraction solution (L) *Rh concentration analytical value in post-extraction solution (mg/L)/1000

Although Rh loss in the extracting operation can be reduced by establishing proper conditions for the re-dissolution of neutralized precipitate with hydrochloric acid, part of Rh is still distributed into the organic phase to some extent, thereby Rh is lost in the organic phase.

Figure 2:
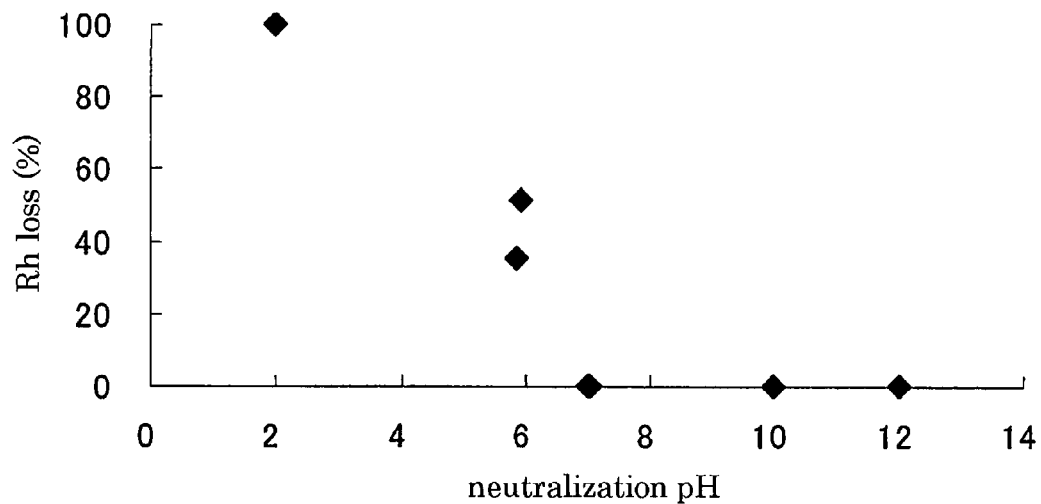
FIG. 2 shows the relation between pH of Rh-containing hydrochloric acid solution in neutralization and Rh loss.

Incidentally, Rh recovery into the neutralized precipitate in the above-mentioned neutralization operation for various pHs are shown in FIG. 2. As shown in the figure, Rh recovery into the neutralized precipitate was raised to 99.9% or above by adjusting pH of the neutralized precipitate to 7-12.

Figure 3:
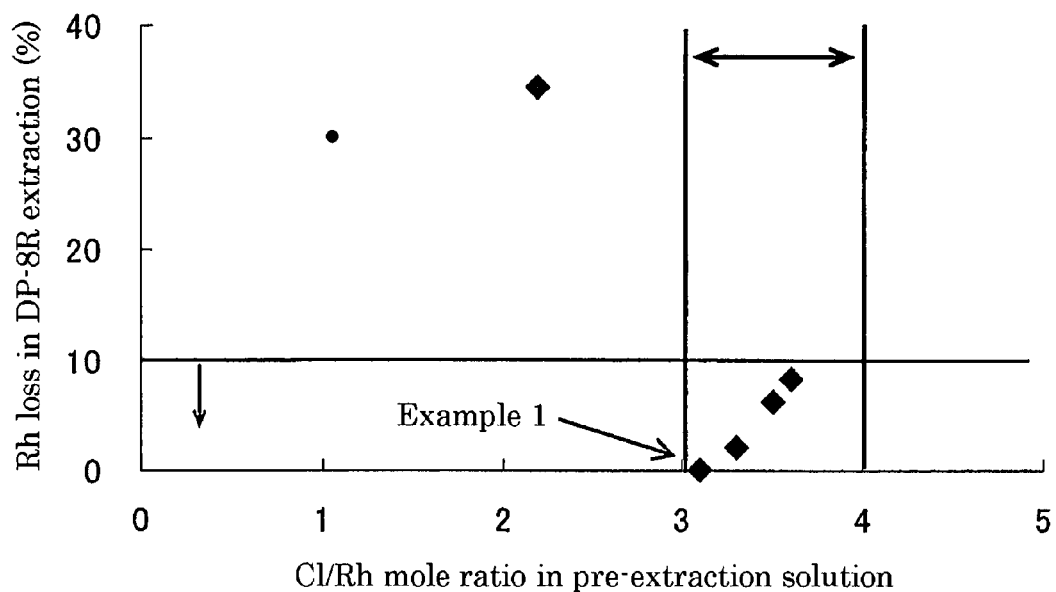
FIG. 3 shows the relation between Rh loss in DP-8R extraction and Cl/Rh mole ratio in pre-extraction solution.

Furthermore, FIG. 3 shows Rh loss in DEHPA extraction of the same manner as the above-mentioned extraction after the same process as the above-mentioned process was conduced except that the amount of additional hydrochloric acid was changed such that the mole ratio Cl/Rh became 2.2-3.6. When the mole ratio Cl/Rh was adjusted to 3.1-3.6, Rh loss in extraction was less than 10%, and heavy metals and alkaline metals in the post-extraction solution were less than 10 mg/L. When the mole ratio Cl/Rh is less than 3, Rh loss increases since phase-separation is worsened, and in extreme case, phase-separation is not occurred at all.

Figure 4:
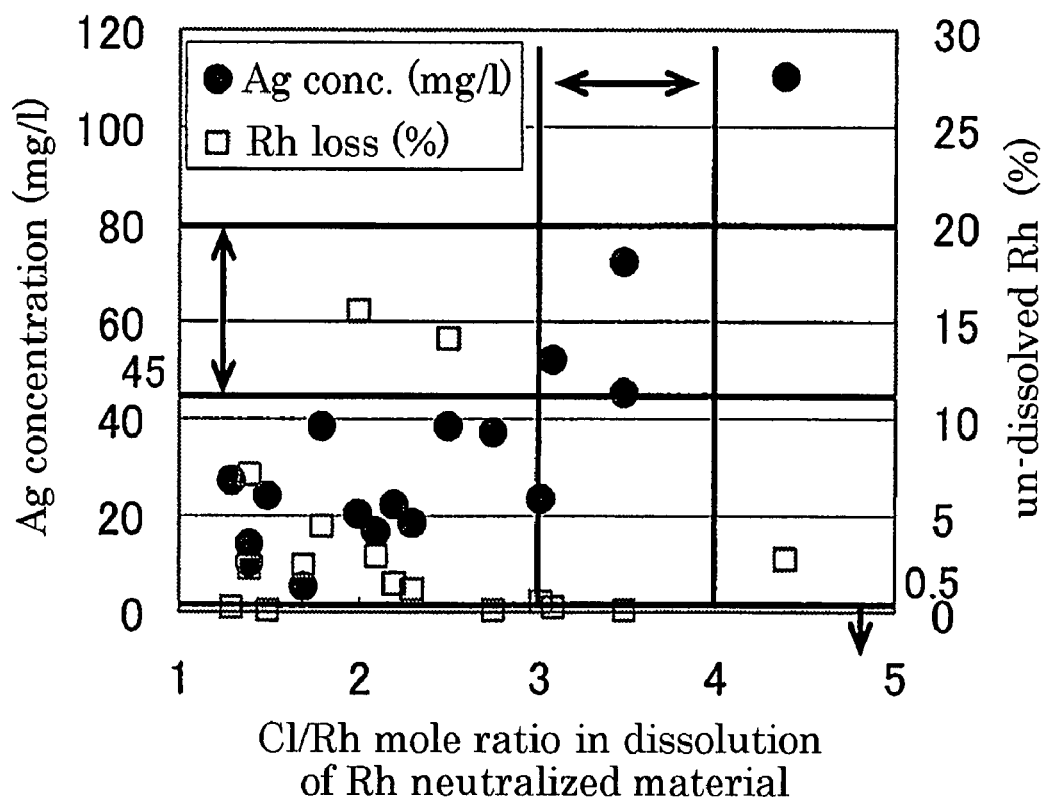
FIG. 4 shows the concentration of Ag in solution and the percentage of undissolved Rh with respect to Cl/Rh mole ratio as the Rh neutralized precipitate is redissolved.

When the mole ratio Cl/Rh is larger, Ag concentration in the solution becomes undesirably higher by the increase of Cl concentration, although there is no adverse effect on Rh loss and on removal of impurities in the DEHPA extraction. FIG. 4 shows Ag concentration and undissolved Rh in the filtrate after the neutralized precipitate was dissolved in hydrochloric acid and filtered in the same manner as above except that mole ratio Cl/Rh was adjusted to 1.3-4.4 as the neutralized precipitate was dissolved in hydrochloric acid. If the amount of hydrochloric acid is reduced in order to lower Ag solubility as the neutralized precipitate is dissolved in hydrochloric acid, part of Rh in the neutralized precipitate is not dissolved, thereby Rh is lost in the filtration residue after the filtration. As shown in the figure, Ag concentration can be reduced to 45-80 mg/L while keeping Rh loss at or less than 0.5% by adjusting the mole ratio Cl/Rh to 3-4 as the neutralized precipitate is redissolved in hydrochloric acid. Rh loss in the redissolution of the neutralized precipitate in hydrochloric acid is calculated with the following equations.

Rh loss in the redissolution of neutralized precipitate (%)=$(A-B)/A*100$ $A$: an amount of Rh in Rh-containing hydrochloric acid (pre-neutralization solution) (g)=an amount of Rh-containing hydrochloric acid (L)*Rh concentration analytical value in Rh-containing hydrochloric acid (mg/L)/1000

$B$: an amount of Rh in redissolved solution (g)=an amount of hydrochloric acid for redissolution (L)*Rh concentration analytical value in redissolved solution (mg/L)/1000

Rh is concentrated from 10 g/L to 50-80 g/L and NaCl is removed by neutralizing Rh-containing hydrochloric acid solution with NaOH aqueous solution, precipitating Rh as the neutralized precipitate, repulp-washing and filtering the neutralized precipitate. In this process, since Rh concentration in post-neutralization solution becomes less than 1 mg/L by establishing proper neutralization conditions, Rh loss in neutralization operation is considered to be zero. In addition, Rh loss occurred during the removal of NaCl into filtrate by the repulp-washing of the neutralized precipitate is also considered to be zero.

As can be seen from the above descriptions, Rh loss can be reduced to less than 10% and heavy metals and alkaline metals in post-extraction solution can be also reduced less than 10 mg/L by adding alkali into Rh-containing hydrochloric acid solution to adjust pH to 7-12, filtering and separating the neutralized precipitate containing Rh and other components, redissolving the neutralized precipitate in hydrochloric acid such that the mole ratio Cl/Rh becomes 3-4, removing Ag as precipitate by filtering the redissolved Rh-containing solution, reducing Ag concentration in the filtrate to or less than 80 mg/L, and extracting with DEHPA.

Comparative Example 1

As a starting material, the Rh-containing hydrochloric acid solution shown in Table 2 was used.

TABLE 2

| | Concentration (mg/l) | | | | | | | | | | | | |
|---|---|---|---|---|---|---|---|---|---|---|---|---|---|
| | Pt | Pd | Ru | Rh | Ir | Mg | Ca | Mn | Fe | Al | Cu | Pb | Ag |
| Rh-containing hydrochloric acid solution | 218 | 140 | 0 | 20709 | 965 | 5 | 30 | 10 | 486 | 31 | 184 | 67 | 819 |
| HCl re-dissolution (before filtration) | — | — | — | — | — | — | — | — | — | — | — | — | — |
| HCl re-dissolution (after filtration) | 137 | 136 | 0 | 46617 | 3205 | 11 | 55 | 28 | 1591 | 85 | 576 | 147 | 26 |
| DP-8R post-extraction solution | — | — | — | — | — | — | — | — | — | — | — | — | — |

The pre-extraction hydrochloric acid solution was prepared by the same process as Example 1 except that hydrochloric acid was added such that the mole ratio Cl/Rh became 2.2 as the neutralized precipitate was redissolved in hydrochloric acid, and the heating was conducted for one hour at 90° C. The color of the solution was greenish reddish brown. NaOH aqueous solution was added to adjust pH to 3.8 while the solution was mixed with 20% DP-8R at the rate of O/A=2:1 and then stirred for 30 minutes, then it was transferred to a separating funnel to leave it at rest for 30 minutes. However, an organic phase and an aqueous phase were suspended heavily, and phase-separation was not occurred. It was speculated that since the amount of hydrochloric acid was insufficient, each component in the aqueous phase could not be dissolved stably in the aqueous phase, thereby parts of them were precipitated.

Comparative Example 2

As a starting material, the Rh hydrochloric acid solution shown in Table 3 was used.

TABLE 3

| | Concentration (mg/l) | | | | | | | | | | | | |
|---|---|---|---|---|---|---|---|---|---|---|---|---|---|
| | Pt | Pd | Ru | Rh | Ir | Mg | Ca | Mn | Fe | Al | Cu | Pb | Ag |
| Rh-containing hydrochloric acid solution | 240 | 278 | 0 | 19996 | 1476 | 4 | 34 | 9 | 472 | 22 | 167 | 39 | 1432 |
| HCl re-dissolution (before filtration) | 201 | 345 | 1 | 49697 | 3743 | 11 | 87 | 32 | 1522 | 49 | 467 | 128 | 2572 |
| HCl re-dissolution (after filtration) | 424 | 272 | 14 | 50637 | 3817 | 12 | 92 | 35 | 1545 | 55 | 528 | 123 | 76 |
| DP-8R post-extraction solution | 709 | 209 | 0 | 46422 | 3219 | 0 | 0 | 1 | 10 | 0 | 1 | 18 | 27 |

The pre-extraction hydrochloric acid solution was prepared by the same process as Example 1 except that hydrochloric acid was added such that the mole ratio Cl/Rh became 2.5 as the neutralized precipitate was redissolved in hydrochloric acid, and the heating was conducted for 30 minutes at 60° C. The color of the solution was blackish brown. NaOH aqueous solution was added to adjust pH to 3.8 while the solution was mixed with 20% DP-8R at the rate of O/A=2:1 and then stirred for 30 minutes, then it was transferred to a separating funnel to leave it at rest for 30 minutes, and an organic phase and an aqueous phase were separated. After repeating this operation twice, the aqueous phase was defined as DP-8R post-extraction solution. In both extracting operations, a suspension phase was generated at the interface. Table 3 shows analytical values before and after the extraction. The elimination of Fe and Pb were unsatisfactory (10 mg/L of Fe and 18 mg/L of Pb). Rh loss by this extracting operation was 19.7%. It was speculated that the amount of added hydrochloric acid and the heating were insufficient.

Table 4 shows conditions, and phase-separation, removal of impurities and Rh loss in DP-8R extraction of Example 1 and Comparative Examples 1 and 2.

occurred, an intermediate phase is generated and Ph loss increases, thereby the extraction and separation of impurities is deteriorated.

By the way, when the mole ratio Cl/Rh is at or above 4, the solubility of AgCl increases, and Ag concentration in the filtrate of redissolved Rh-containing hydrochloric acid increases, thereby Ag grade may undesirably rise in the Rh-containing end product. FIG. 4 shows the relation between the mole ratio Cl/Rh and Ag concentration in redissolved Rh-containing hydrochloric acid. Ag concentration can be reduced to less than 80 mg/L by conducting the redissolution in hydrochloric acid with the conditions of the mole ratio Cl/Rh being at or less than 4 and the heating temperature being at or above 60° C., cooling the solution to room temperature, and filtering it with 0.1 μm membrane filter. When the mole ratio Cl/Rh is in the range of 3-4, Ag concentration can be reduced to 45-80 mg/L, and undissolved Rh is at or less than 0.5% with these conditions. As can be seen from the above descriptions, with the method according to claim 1, heavy metals and alkaline earth metals can be removed effectively without substantial Rh loss.

TABLE 4

| | Condtions for re-dissolution by hydrochloric acid | | | Results for DP-8R extraction | | | | | | |
|---|---|---|---|---|---|---|---|---|---|---|
| | Amount of HCl (aqua) (Cl/Rh mole ratio) | Heating temperature | Heating time | Color of solution | Phase separation | Impurities consentration in post-extraction solutuion (mg/l) | | | Rh loss (%) | Evaluation |
| | | | | | | Fe | Cu | Pb | | |
| Example 1 | 3.1 | 90° C. | one hour | reddish brown | good | 9 | <1 | 4 | 0.1 | Rh loss is small. Impurities removal is good. |
| Comparative Example 1 | 2.2 | 90° C. | one hour | greenish reddish brown | no separation due to oil-water suspention | — | — | — | — | Extracting is impossible with no pahse separation. |
| Comparative Example 2 | 2.5 | 60° C. | 30 minutes | blackish brown | suspansion phase at oil-water interface | 10 | 1 | 18 | 19.7 | Rh loss is large. Impurities removal is insufficient. |

Rh loss can be reduced to or less than 10% in DEHPA extraction, and heavy metals and alkaline earth metals can be reduced to less than 10 mg/L by adjusting mole ratio Cl/Rh to 3-4 as Rh-containing neutralized precipitate is redissolved in hydrochloric acid, and heating it for one hour at or above 90° C. as in Example 1. When the mole ratio Cl/Rh is less than 3 as in Comparative Examples 1 and 2, regardless of heating temperature, the phase-separation is not sufficient to conduct extracting operation; or even if the phase-separation is Example 2

Separate Addition of Hydrochloric Acid

Figure 5:
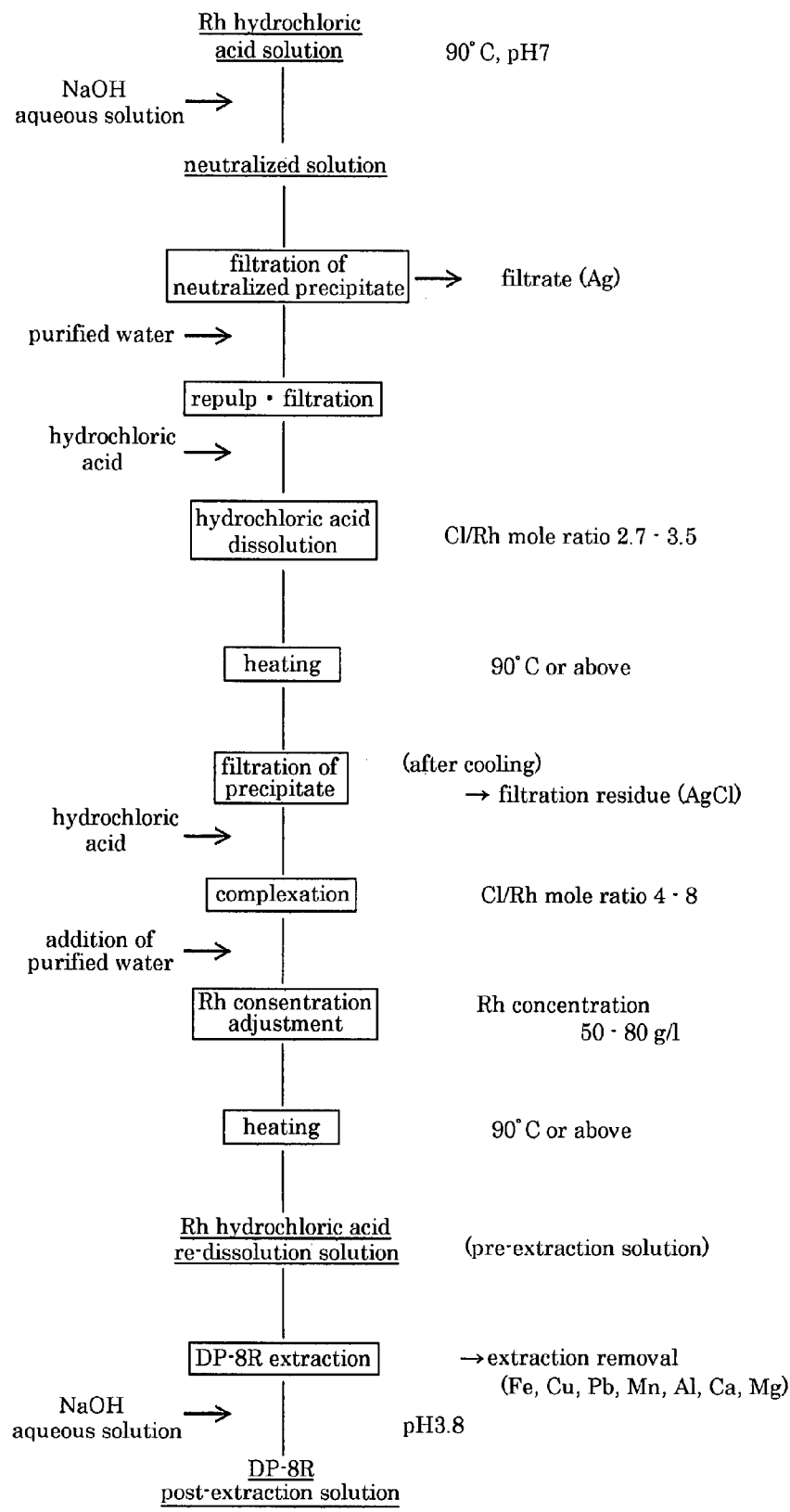
FIG. 5 shows a flow sheet of another aspect of the invention, which is different from that of FIG. 1.

The method according to the present invention with separate additions of hydrochloric acid will be explained below along the flow sheet shown in FIG. 5. As a starting material, the Rh-containing hydrochloric acid solution shown in Table 5 was used.

TABLE 5

| | Concentration (mg/l) | | | | | | | | | | | | |
|---|---|---|---|---|---|---|---|---|---|---|---|---|---|
| | Pt | Pd | Ru | Rh | Ir | Mg | Ca | Mn | Fe | Al | Cu | Pb | Ag |
| Rh-containing hydrochloric acid solution | 37 | 145 | 0 | 7521 | 104 | 2 | 9 | 5 | 111 | 7 | 186 | 60 | 381 |
| HCl re-dissolution (before filtration) | 252 | 1207 | 0 | 61285 | 684 | 16 | 76 | 39 | 792 | 51 | 1411 | 407 | 51 |
| HCl re-dissolution (after filtration) | 216 | 1133 | 0 | 55531 | 628 | 15 | 71 | 36 | 736 | 48 | 1310 | 378 | 45 |
| DP-8R pre-extraction solution | 236 | 1094 | 0 | 52056 | 614 | 15 | 65 | 36 | 731 | 48 | 1299 | 381 | 45 |
| DP-8R post-extraction solution | 206 | 1026 | 0 | 51773 | 607 | 0 | 0 | 0 | 0 | 0 | 0 | 0 | 42 |

After adding NaOH aqueous solution to 9 L of the solution to adjust pH of the solution to 7 at 90° C., it was left overnight to be cooled. The neutralized precipitate was vacuum-filtered with 5 C. filter to remove part of Ag into the filtrate. After the neutralized precipitate was repulp-washed with purified water, the vacuum-filtration was repeated twice to sufficiently remove NaCl.

Hydrochloric acid was added to the neutralized precipitate such that the mole ratio Cl/Rh became 3.5, then after purified water was added to adjust Rh concentration in the solution to about 50 g/L, the solution was heated for 30 minutes at 80° C., and the neutralized precipitate was completely dissolved. The color of the solution was reddish brown. After being left overnight to be cooled, the precipitate, which was predominantly composed of AgCl, was filtered and separated with 0.1 μm membrane filter. Ag concentration in filtrate was 45 mg/L, and it is comparable to the Ag concentration of 37 mg/L in Example 1. Undissolved Rh was at 0.1% in this example.

After additional hydrochloric acid was added to the filtrate to adjust the mole ratio Cl/Rh to 4.0, it was heated for two hours at 95° C. in order to accelerate Cl coordination to Rh. The reddish brown color of the solution increased its reddishness. After it was cooled to room temperature, it was used as the pre-extraction solution. Solvent extraction was conducted using DP-8R (Daihachi Chemical Industry Co., Ltd.), which was diluted to 20% with kerosene. 20% DP-8R was added to the pre-extraction solution in the rate of O/A=1:1, and NaOH aqueous solution was added to adjust pH to 3.8 with stirring. After being stirred for 30 minutes, the solution was transferred to a separating funnel to leave it at rest, and an organic phase and an aqueous phase were separated. After repeating this operation twice, the aqueous phase was defined as DP-8R post-extraction solution. Phase-separation was excellent in both extracting operations. Table 5 shows analytical values. All heavy metals except Ag, and alkaline earth metals were reduced to or less than 10 mg/L. Rh loss by this extracting operation was 0.8%.

Figure 6:
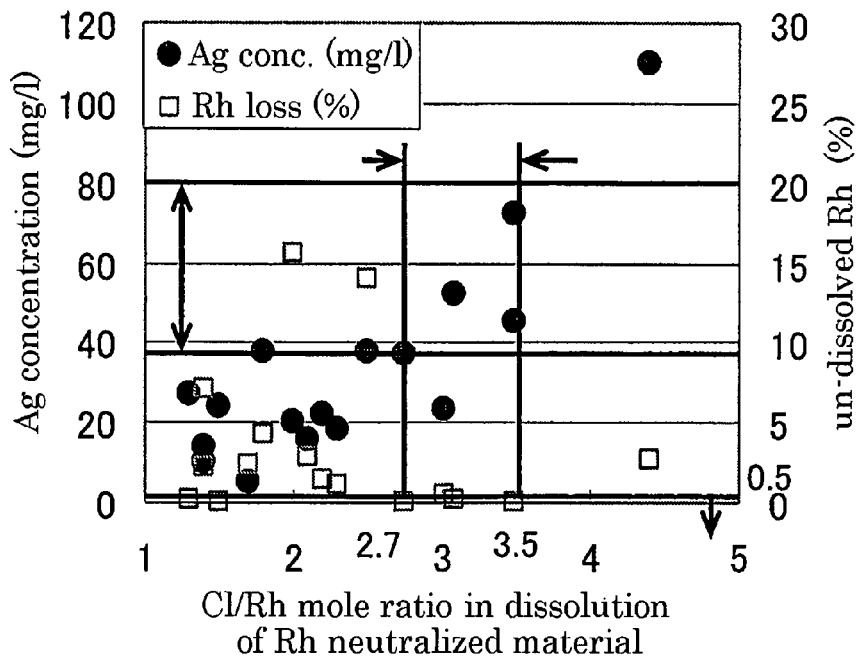
FIG. 6 shows the concentration of Ag in solution and the percentage of undissolved Rh with respect to Cl/Rh mole ratio as the Rh neutralized precipitate is redissolved.

Incidentally, FIG. 6 shows Ag concentration and undissolved Rh in the filtrate after the neutralized precipitate was redissolved in hydrochloric acid and filtered in the same manner as Example 2 except that the mole ratio Cl/Rh was adjusted to 1.3-4.4 as the neutralized precipitate was dissolved by hydrochloric acid. Ag concentration can be reduced to less than 80 mg/L while Rh loss is kept to or less than 0.5% by adjusting the mole ratio Cl/Rh to 2.7-3.5 as the neutralized precipitate is redissolved by hydrochloric acid.

Figure 7:
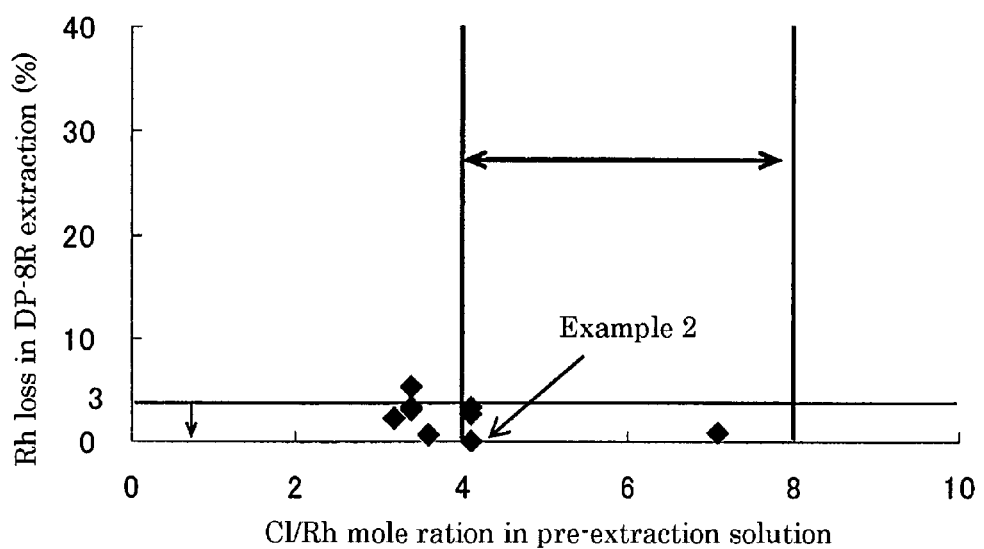
FIG. 7 shows the relation between Cl/Rh mole ratio in pre-extraction solution and Rh loss in DP-8R extraction.

Further, FIG. 7 shows Rh loss in DEHPA extraction conducted in the same manner as Example 1 after the same process as Example 2 was conducted except that the mole ratio Cl/Rh was adjusted to 3.1-7.1 as the additional hydrochloric acid was added. When the mole ratio Cl/Rh was adjusted to 4-7.1, Rh loss in the extraction was less than 3%. In addition, heavy metals and alkaline metals in the post-extraction solution were less than 10 mg/L.

When the mole ratio Cl/Rh is larger, it may cause undesirable NaCl precipitation due to the increase of Cl as NaOH aqueous solution is added at following other extracting operations although there is no adverse effect on Rh loss and the removal of impurities in DEHPA extraction. Therefore, it is desirable to adjust the mole ratio Cl/Rh to or less than 8.

As can be seen from above descriptions, with the method according to claim 2, Rh loss can be reduced to less than 4% and heavy metals and alkaline metals in the post-extraction solution can be also reduced to less than 10 mg/L by adding alkali into Rh-containing hydrochloric acid to adjust pH to 7-12, filtering and separating the neutralized precipitate containing Rh and other components, redissolving the neutralized precipitate in hydrochloric acid such that the mole ratio Cl/Rh becomes 2.7-3.5, removing Ag as precipitate by filtering the redissolved Rh-containing solution, reducing Ag concentration in the filtrate to or less than 80 mg/L, adding additional hydrochloric acid to adjust the mole ratio Cl/Rh to 4-8, heating the solution, and extracting with DEHPA.

Comparative Example 3

As a starting material, the Rh-containing hydrochloric acid solution shown in Table 6 was used.

TABLE 6

| | Concentration (mg/l) | | | | | | | | | | | | |
|---|---|---|---|---|---|---|---|---|---|---|---|---|---|
| | Pt | Pd | Ru | Rh | Ir | Mg | Ca | Mn | Fe | Al | Cu | Pb | Ag |
| Rh-containing hydrochloric acid solution | 218 | 140 | 0 | 20709 | 965 | 5 | 30 | 10 | 486 | 31 | 184 | 67 | 819 |
| HCl re-dissolution (before filtration) | — | — | — | — | — | — | — | — | — | — | — | — | — |
| HCl re-dissolution (after filtration) | 298 | 83 | 0 | 31193 | 696 | 10 | 53 | 35 | 1833 | 86 | 485 | 116 | 62 |
| DP-8R post-extraction solution | 91 | 67 | 0 | 27522 | 1903 | 0 | 0 | 0 | 4 | 1 | 1 | 13 | 66 |

The pre-extraction hydrochloric acid solution was prepared by the same process as Example 1 except that hydrochloric acid was added such that the mole ratio Cl/Rh became 4.0 as the neutralized precipitate was dissolved in the hydrochloric acid, and the heating was conducted for 30 minutes at 60° C. after the concentration adjustment by the addition of purified water. The color of the solution was reddish brown. NaOH aqueous solution was added to adjust pH to 3.8 while the solution was mixed with 20% DP-8R in the rate of O/A=2:1 and stirred, then it was transferred to a separating funnel to leave it at rest for 30 minutes, and an organic phase and an aqueous phase were separated.

After repeating this operation twice, the aqueous phase was defined as DP-8R post-extraction solution. In both extracting operations, a suspension phase was generated at the interface. Table 4 shows analytical values before and after the extraction. The elimination of Pb were unsatisfactory (13 mg/L of Pb). Rh loss by this extracting operation was 7.7%. It is speculated that since the heating after the re-dissolution was insufficient, Cl coordination to Rh was insufficient, thereby part of Rh chloro complex was precipitated into the suspension phase, or extracted into DP-8R.

Table 7 shows conditions, and phase-separation, removal of impurities and Rh loss in DP-8R extraction of Example 1, Example 2, and Comparative Example 3.

As shown in Comparative Example 3, when the heating temperature is lower and the heating time is shorter compared to Example 1, an intermediate phase is generated in DEHPA extraction, thereby the extraction separation of impurities is deteriorated and Rh loss increases to 7.7% even though the mole ratio Cl/Rh is kept within the range of 3-4. On the other hand, as shown in Examples 1 and 2, when the heating temperature is at or above 90° C. and the heating time is one hour or longer, provided that the mole ratio Cl/Rh is 3 or greater it is speculated, from the fact that Rh loss can be reduced to less than 1%, that Cl coordination to Rh is progressed sufficiently, and the heating temperature and time are also sufficient.

Example 2 except that Ru concentrations in Rh hydrochloric acid were 0 mg/L and about 10-800 mg/L. The color of the solution was reddish brown. NaOH aqueous solution was added to adjust pH to 3.8 while the solution was mixed with 20% DP-8R in the rate of O/A=1:1 and stirred, then it was transferred to a separating funnel to leave it at rest for 30

TABLE 7

| | Heating conditions for pre-extraction solution | | | | | Results for DP-8R extraction | | | | |
|---|---|---|---|---|---|---|---|---|---|---|
| | Amount of HCl (aqua) (Cl/Rh mole ratio) | Heating temperature | Heating time | Color of solution | Phase separation | Impurities consentration in post-extraction solutuion (mg/l) Fe Cu Pb | | | Rh loss (%) | Evaluation |
| Example 1 | 3.1 | 90° C. | one hour | reddish brown | good | 9 | 0 | 4 | 0.1 | Rh loss is small. Impurities removal is good. |
| Example 2 | 4.0 | 95° C. | two hours | reddish brown | good | 0 | 0 | 0 | 0.8 | Rh loss is small. Impurities removal is good. |
| Comparative Example 3 | 4.0 | 60° C. | 30 minutes | reddish brown | suspansion phase at oil-water interface | 4 | 1 | 13 | 7.7 | Rh loss is large. Impurities removal is insufficient. |

Example 3

Preremoval of Ru Before Extraction Process

The method for removal of Ru before the extraction process will be explained hereinafter in detail with an example. As a starting material, the Rh hydrochloric acid solution shown in Tables 8-12 was used. The pre-extraction hydrochloric acid solution was prepared by the same process as Example 2 except that Ru concentrations in Rh hydrochloric minutes, and an organic phase and an aqueous phase were separated.

After conducting this operation once, the aqueous phase was defined as DP-8R post-extraction solution. Tables 8-12 show analytical values before extracting process and the aqueous phase after the process with various Ru concentrations in the solution to be refined (hydrochloric acid for redissolution (after the filtration)).

TABLE 8

| | Concentration (mg/l) | | | | | | | | | | | | |
|---|---|---|---|---|---|---|---|---|---|---|---|---|---|
| | Pt | Pd | Ru | Rh | Ir | Mg | Ca | Mn | Fe | Al | Cu | Pb | Ag |
| HCl re-dissolution (after filtration) | 311 | 214 | 884 | 47551 | 3248 | 7 | 55 | 50 | 1300 | 44 | 265 | 91 | 33 |
| DP-8R post-extraction solution | 285 | 167 | 539 | 42096 | 2933 | 0 | 0 | 0 | 1 | 0 | 0 | 12 | 29 |

TABLE 9

| | Concentration (mg/l) | | | | | | | | | | | | |
|---|---|---|---|---|---|---|---|---|---|---|---|---|---|
| | Pt | Pd | Ru | Rh | Ir | Mg | Ca | Mn | Fe | Al | Cu | Pb | Ag |
| HCl re-dissolution (after filtration) | 258 | 173 | 123 | 38464 | 2637 | 6 | 45 | 41 | 1101 | 36 | 219 | 76 | 25 |
| DP-8R post-extraction solution | 238 | 152 | 62 | 34120 | 2314 | 0 | 0 | 0 | 0 | 0 | 3 | 5 | 22 |

TABLE 10

| | Concentration (mg/l) | | | | | | | | | | | |
|---|---|---|---|---|---|---|---|---|---|---|---|---|
| | Pt | Pd | Ru | Rh | Ir | Mg | Ca | Mn | Fe | Al | Cu | Pb | Ag |
| HCl re-dissolution (after filtration) | 300 | 218 | 7 | 46808 | 3264 | 7 | 52 | 48 | 1304 | 42 | 254 | 89 | 32 |
| DP-8R post-extraction solution | 279 | 195 | 14 | 42560 | 2918 | 0 | 0 | 0 | 1 | 0 | 2 | 6 | 28 |

TABLE 11

| | Concentration (mg/l) | | | | | | | | | | | |
|---|---|---|---|---|---|---|---|---|---|---|---|---|
| | Pt | Pd | Ru | Rh | Ir | Mg | Ca | Mn | Fe | Al | Cu | Pb | Ag |
| HCl re-dissolution (after filtration) | 289 | 199 | 0 | 44530 | 2995 | 7 | 51 | 45 | 1221 | 40 | 245 | 85 | 30 |
| DP-8R post-extraction solution | 272 | 179 | 6 | 41599 | 2809 | 0 | 0 | 0 | 1 | 0 | 4 | 4 | 26 |

TABLE 12

| | Concentration (mg/l) | | | | | | | | | | | |
|---|---|---|---|---|---|---|---|---|---|---|---|---|
| | Pt | Pd | Ru | Rh | Ir | Mg | Ca | Mn | Fe | Al | Cu | Pb | Ag |
| HCl re-dissolution (after filtration) | 258 | 258 | 0 | 51155 | 3587 | 8 | 61 | 55 | 1433 | 49 | 300 | 103 | 37 |
| DP-8R post-extraction solution | 234 | 249 | 0 | 47824 | 3334 | 0 | 0 | 0 | 4 | 0 | 4 | 8 | 33 |

Figure 8:
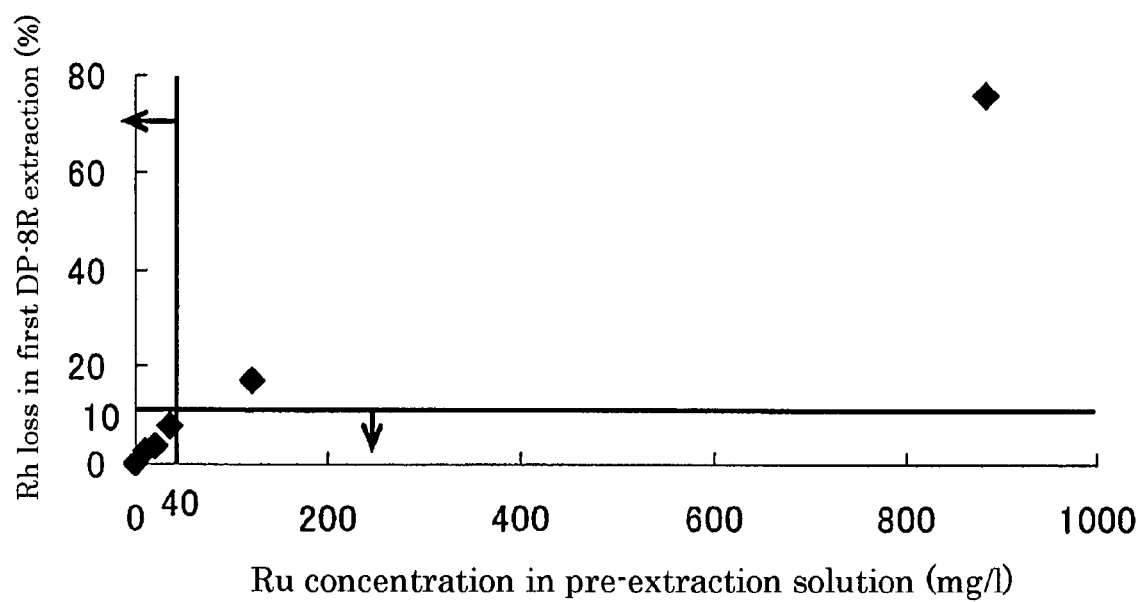
FIG. 8 shows the relation of Rh loss in DP-8R extraction and Ru concentration in pre-extraction solution.

Table 13 and FIG. 8 show Ru concentration in pre-extraction solution, phase-separation, removal of impurities and Rh loss in DP-8R extraction.

TABLE 13

| Hydrochloric acid re-dissolving solution | | | Pb concentration in post-extraction solution first extraction | Rh loss first extraction % | Phase separation first extraction |
|---|---|---|---|---|---|
| Rh g/l | Ru mg/l | Pb mg/l | mg/l | | |
| 47.6 | 884 | 91 | 24 | 75.9 | suspension throughout solution |
| 38.5 | 123 | 76 | 5 | 16.8 | genaration of intermediate phase |
| 60.6 | 37 | 250 | 14 | 7.7 | genaration of intermediate phase |
| 46.8 | 20 | 89 | 6 | 3.8 | good |
| 44.5 | 10 | 85 | 4 | 2.4 | good |
| 51.2 | 0 | 103 | 8 | 0.0 | good |

If Ru concentration is at or less than 20 mg/L, the phase-separation is satisfactory, and heavy metals such as Pb and alkaline earth metals can be reduced less than 10 mg/L and Rh loss can be also reduced to less than 6%. Although it is not certain, it is believed that since Ru cannot exist stably in the aqueous phase during extracting operation, it forms sludge. The removal of Ru can be conducted by such method as distillation before the extraction.

As can be seen from above descriptions, with Examples 1, 2 and 3, good phase-separation is obtained and heavy metals and alkaline earth metals can be removed without substantial Rh loss.

What is claimed is:

1. A method of refining an Rh-containing hydrochloric acid solution also containing Ag and at least one other impurity of heavy metals and alkaline earth metals, the method comprising the steps of:
    (a) adding an alkali to the solution to adjust pH of the solution to 7-12, whereby generating a neutralized precipitate containing Rh and other components;
    (b) filtrating and separating the neutralized precipitate;
    (c) adding a first hydrochloric acid for dissolving the neutralized precipitate in an amount such that the mole ratio of Cl to Rh of a resulting solution becomes 3-4;
    (d) filtering the resulting solution to remove Ag as precipitate, and
    (e) extracting the solution obtained by the previous step as an aqueous phase with di(2-ethylhexyl)phosphoric acid.

2. A method of refining an Rh-containing hydrochloric acid solution also containing Ag and at least one other impurity of heavy metals and alkaline earth metals, the method comprising the steps of:
    (a) adding an alkali to the solution to adjust pH of the solution to 7-12, whereby generating a neutralized precipitate containing Rh and other components;
    (b) filtrating and separating the neutralized precipitate;
    (c) adding a first hydrochloric acid for dissolving the neutralized precipitate in an amount such that the mole ratio of Cl to Rh of a resulting solution becomes 2.7-3.5;
    (d) filtering the resulting solution to remove Ag as precipitate,
    (d') adding a second hydrochloric acid in an amount such that the mole ratio Cl/Rh of a resulting solution becomes 4-8, and
    (e) extracting the solution obtained by the previous step as an aqueous phase with di(2-ethylhexyl)phosphoric acid.

3. The method according to the claim 1, wherein, in step (c), the resulting solution is heated at or above 90° C. and then cooled.

4. The method according to the claim 2, wherein, in step (d'), the resulting solution is heated at or above 90° C. and then cooled to room temperature.

5. The method according to claim 1 or 3, wherein, in step (c), Ru in the resulting solution is reduced to less than or equal to 20 mg/L to keep the recovery rate of Rh into the aqueous phase high.

6. The method according to claim 2 or 4, wherein, in step (c) or (d'), Ru in the resulting solution is reduced to less than or equal to 20 mg/L to keep the recovery rate of Rh into the aqueous phase high.

* * * * *